United States Patent
Voci et al.

(10) Patent No.: US 11,279,796 B2
(45) Date of Patent: Mar. 22, 2022

(54) HEAT-CURING EPOXY RESIN ADHESIVES

(71) Applicant: SIKA TECHNOLOGY AG, Baar (CH)

(72) Inventors: Antonio Voci, Zürich (CH); Michael Gutgsell, Uster (CH); Christian Eyholzer, Rochester Hills, MI (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/618,240

(22) PCT Filed: May 29, 2018

(86) PCT No.: PCT/EP2018/064090
§ 371 (c)(1),
(2) Date: Nov. 29, 2019

(87) PCT Pub. No.: WO2018/219961
PCT Pub. Date: Dec. 6, 2018

(65) Prior Publication Data
US 2020/0190252 A1    Jun. 18, 2020

(30) Foreign Application Priority Data
May 29, 2017   (EP) .................................. 17173288

(51) Int. Cl.
| C08G 59/40 | (2006.01) |
| C09J 7/35 | (2018.01) |
| C08G 59/50 | (2006.01) |
| C08G 59/62 | (2006.01) |
| C09J 163/00 | (2006.01) |

(52) U.S. Cl.
CPC ..... *C08G 59/4021* (2013.01); *C08G 59/5033* (2013.01); *C08G 59/623* (2013.01); *C09J 7/35* (2018.01); *C09J 163/00* (2013.01)

(58) Field of Classification Search
CPC ............ C08G 59/4021; C08G 59/5033; C08G 59/623; C09J 7/35; C09J 163/00

USPC ......................................................... 528/121
See application file for complete search history.

(56) References Cited

FOREIGN PATENT DOCUMENTS

| CH | 699848 A2 | 5/2010 |
| CN | 102286138 A | 12/2011 |
| EP | 1475412 A1 | 11/2004 |
| EP | 2113525 A1 | 11/2009 |

OTHER PUBLICATIONS

Chen et al., CN 102286138 A machine translation in English, Dec. 21, 2011 (Year: 2011).*
Liu et al., "Effect of Mesoscopic Fillers on the Polymerization Induced Viscoelastic Phase Separation at Near- and Off-Critical Compositions", The Journal of Physical Chemistry B, 2012, vol. 116, p. 3671-3682 (Year: 2012).*
Dec. 3, 2019 International Preliminary Report on Patentability issued in International Patent Application No. PCT/EP2018/064090.
Jul. 6, 2018 International Search Report issued in International Patent Application No. PCT/EP2018/064090.

* cited by examiner

*Primary Examiner* — David T Karst
(74) *Attorney, Agent, or Firm* — Oliff PLC

(57) ABSTRACT

A heat-curing epoxy resin compositions which can in particular be used as bodyshell adhesives for motor vehicle construction. The heat-curing epoxy resin compositions contain a curing agent which can be activated through elevated temperature and has a first component K1 containing at least one epoxy resin and a second component K2 containing at least one tertiary amine and also a primary amine. These compositions, after short-term heating of 30 to 120 seconds at a temperature of 90° C. to 130° C., exhibit sufficient strength and adhesion to withstand transport-induced mechanical strains.

17 Claims, No Drawings

HEAT-CURING EPOXY RESIN ADHESIVES

TECHNICAL FIELD

The present invention relates to the field of heat-curing epoxy resin bodyshell adhesives, in particular the field of hem flange adhesive bonds.

STATE OF THE ART

Heat-curing epoxy resin adhesives have already been used for a long time as adhesives for the bodyshell construction of transportation means and also for hem flange adhesive bonds in industrial production. It is known to manufacture parts of transportation means, such as doors, trunk hoods, tailgates, engine hoods and the like, from an outer panel and an inner panel by means of flange bonding In order to ensure fixing of the flange, an adhesive is used here, which bonds the inner panel to the outer panel. Up to the final curing of the adhesive, the component part with the hem flange is typically moved further and the joint is thereby mechanically stressed. In order to guarantee correct and functional positioning of the hem flange adhesive bonds, it would be advantageous, through a short-term heat treatment, in particular an inductive heating, partially to cure, respectively to precure, the adhesive, in order to guarantee sufficient strength and adhesion for the further transportation of the component part up to the final curing of the adhesive. The final curing of the adhesive typically takes place at a temperature of 140-220° C.

EP 2 113 525 discloses activators for heat-curing epoxy resin compositions which are distinguished by a good activation effect and also a good storage stability.

DESCRIPTION OF THE INVENTION

It is accordingly an object of the present invention to make available heat-curing epoxy resin compositions which, after short-term heating of 30 to 120 seconds at a temperature of 90° C. to 130° C., exhibit sufficient strength and adhesion to withstand transport-induced mechanical strains. In addition, the strength and adhesion of the completely cured epoxy resin compositions should satisfy the requirements of a structural adhesive.

Surprisingly, it has been found that a heat-curing epoxy resin composition as claimed in claim 11 was capable of achieving this object.

Further aspects are the subject of further independent claims. Preferred embodiments of the invention are the subject of the dependent claims.

Ways of Executing the Invention

The present invention relates, in a first aspect, to a heat-curing epoxy resin composition comprising:

a first component K1 containing:
  at least one epoxy resin A with, on average, more than one epoxy group per molecule;
a second component K2 containing:
  at least one tertiary amine tAM of the formula

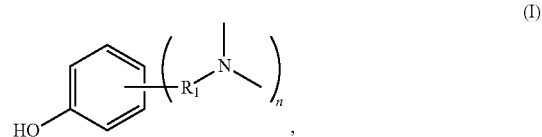

(I)

in which $R_1$ is an alkylene group with 1-20 carbon atoms, which is optionally substituted and optionally exhibits heteroatoms, and n is a value of 1-3;
  at least one primary amine pAM chosen from the list consisting of 1,3-xylylenediamine (MXDA), 1,4-xylylenediamine (PXDA) and 1,3,5-tris(aminomethyl)benzene, in particular 1,3-xylylenediamine (MXDA),
in which the heat-curing epoxy resin composition additionally contains at least one curing agent B for epoxy resins, which is activated by elevated temperature,
and in which the ratio of the proportion of tertiary amine tAM in grams per mole of epoxy groups of the epoxy resin A is 2.4-19.6 g/mol of epoxy groups, and in which the ratio of the proportion of primary amine pAM in grams per mole of epoxy groups of the epoxy resin A is 6-31 g/mol of epoxy groups.

The heat-curing epoxy resin composition comprises a first component K1 comprising at least one epoxy resin A with, on average, more than one epoxy group per molecule. The epoxy group is present preferably as glycidyl ether group. The epoxy resin A with, on average, more than one epoxy group per molecule is preferably a liquid epoxy resin or a solid epoxy resin. The term "solid epoxy resin" is very well known to a person skilled in the art of epoxies and is used in contrast to "liquid epoxy resins". The glass transition temperature of solid resins is above ambient temperature, i.e. they can be comminuted at ambient temperature to give pourable powders.

Preferred Solid Epoxy Resins Exhibit the Formula (A-I)

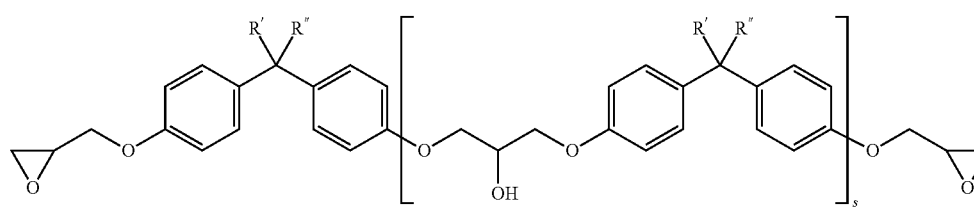

(A-I)

The substituents R' and R" here are, independently of each other, either H or $CH_3$. The term "independently of each other" or "independently of one another" in the definition of groups and radicals means, in this document, in each case, that several groups present which are identically described in the formulae can in each case exhibit different meanings.

Furthermore, the index s has a value of >1.5, in particular of 2 to 12.

Such solid epoxy resins are commercially available, for example from Dow or Huntsman or Hexion.

Compounds of the formula (A-I) with an index s between 1 and 1.5 are described as semisolid epoxy resins by a person skilled in the art. For the present invention here, they are likewise considered to be solid resins. However, epoxy resins in the narrower sense, i.e. where the index s exhibits a value of >1.5, are preferred.

Preferred Liquid Epoxy Resins Exhibit the Formula (A-II)

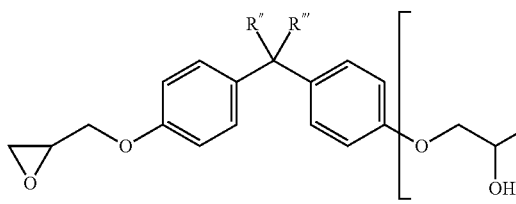 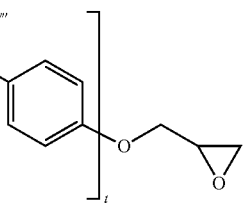

(A-II)

The substituents R''' and R'''' here are, independently of each other, either H or $CH_3$. Furthermore, the index r has a value of 0 to 1. Preferably, r has a value of less than 0.2.

Diglycidyl ethers of bisphenol A (BADGE), of bisphenol F and also of bisphenol A/F are accordingly preferred (the description "A/F" refers here to a mixture of acetone with formaldehyde, which is used as starting material in its preparation). Such liquid resins are available, for example, as Araldite® GY 250, Araldite® PY 304, Araldite® GY 282 (Huntsman or Hexion) or D.E.R.™ 331 or D.E.R.™ 330 (Dow) or Epikote 828 (Hexion).

Preferably, the epoxy resin A represents a liquid epoxy resin of the formula (A-II). In a still more preferred embodiment, the heat-curing epoxy resin composition contains both at least one liquid epoxy resin of the formula (A-II) and at least one solid epoxy resin of the formula (A-I).

The proportion of epoxy resin A is preferably 10-85% by weight, in particular 25-70% by weight, preferably 25-60% by weight, 30-60% by weight, particularly preferably 30-50% by weight, based on the total weight of the heat-curing epoxy resin composition.

The heat-curing epoxy resin composition contains at least one curing agent B for epoxy resins, which is activated through elevated temperature, preferably at temperatures of 70° C. for more. Preferably, a curing agent is concerned here which is chosen from the group consisting of dicyandiamide, guanamine, guanidine, aminoguanidine and their derivatives. Furthermore, curing agents which are effective as accelerators are possible, such as substituted ureas, such as, for example, 3-(3-chloro-4-methylphenyl)-1,1-dimethylurea (chlortoluron) or phenyldimethylurea, in particular p-chlorophenyl-N,N-dimethylurea (monuron), 3-phenyl-1, 1-dimethylurea (fenuron) or 3,4-dichlorophenyl-N,N-dimethylurea (diuron). Furthermore, use may be made of compounds of the class of the imidazoles, such as 2-isopropylimidazole or 2-hydroxy-N-(2-(2-(2-hydroxyphenyl)-4,5-dihydroimidazol-1-yl)ethyl)benzamide, and amine complexes.

The curing agent B is preferably a curing agent which is chosen from the group consisting of dicyandiamide, guanamine, guanidine, aminoguanidine and their derivatives; substituted ureas, in particular 3-(3-chloro-4-methylphenyl)-1,1-dimethylurea (chlortoluron), or phenyldimethylureas, in particular p-chlorophenyl-N,N-dimethylurea (monuron), 3-phenyl-1,1-dirriethylurea (fenuron), 3,4-dichlorophenyl-N,N-dimethylurea (diuron), and also imidazoles and amine complexes.

Dicyandiamide is particularly preferred as curing agent B.

It is further preferred for the curing agent B to be in the first component K1.

The amount of the curing agent B for epoxy resins, which is activated through elevated temperature, is advantageously 0.1-30% by weight, in particular 0.2-10% by weight, preferably 1-10% by weight, particularly preferably 5-10% by weight, based on the weight of the epoxy resin A.

Preferably, the ratio of the proportion of dicyandiamide B in grams per mole of epoxy groups of the epoxy resin A is 10-20 g/mol, in particular 12.5-17.5 g/mol, of epoxy groups.

The second component K2 of the heat-curing epoxy resin composition contains at least one tertiary amine tAM of the formula (I), in which $R_1$ is an alkylene group with 1-20 carbon atoms, which is optionally substituted and optionally exhibits heteroatoms, and n is a value of 1-3.

Preferably, $R_1$ is $CH_2$ or $-CH_2-NH-C_3H_6$ and n=1-3, in particular 3.

Preferably, the tertiary amine tAM is chosen from the group consisting of 2-(dimethylaminomethyl)phenol, 2,6-bis(dimethylaminomethyl)phenol, 2,4-bis(dimethylaminomethyl)phenol, 2,4,6-tris(dimethylaminomethyl)phenol and 2,4,6-tris(((3-(dimethylamino)propyl)amino)methyl) phenol.

Particularly preferably, the tertiary amine tAM is chosen from the group consisting of 2,4,6-tris(((3-(dimethylamino) propyl)amino)methyl)phenol and 2,4,6-tris(dimethylaminomethyl)phenol, most preferably tris(dimethylaminomethyl)phenol.

2,4,6-Tris(dimethylaminomethyl)phenol is, for example, commercially available as Ancamine K54® at Air Products GmbH (Germany).

The ratio of the proportion of tertiary amine tAM in grams per mole of epoxy groups of the epoxy resin A is 2.4-19.6 g/mol of epoxy groups.

Preferably, the ratio of the proportion of tertiary amine tAM in grams per mole of epoxy groups of the epoxy resin A is 2.4-13.7 g/mol, 3.1-13.7 g/mol, 3.1-11.8 g/mol, in particular 3.1-9.8 g/mol, of epoxy groups. This is advantageous to the effect that, through this, high values for the tensile shear strength after heating at a temperature of 90-130° C., in particular of 110-120° C., for 10 s-300 s, in particular 30 s-90 s, and also a high tensile shear strength after the curing at a temperature in the range from 100 to 220° C., preferably 160 to 190° C., for 10 min-6 h, in particular 10 min-60 min, are obtained.

It can further be advantageous if the ratio of the proportion of tertiary amine tAM in grams per mole of epoxy groups of the epoxy resin A is 4.7-13.7 g/mol, in particular 5.9-9.8 g/mol, of epoxy groups. This is beneficial for high values for the tensile shear strength after heating at a temperature of 90-130° C., in particular of 110-120° C., for 10 s-300 s, in particular 30 s-90 s, and also for a high tensile shear strength after the curing at a temperature in the range from 100 to 220° C., preferably 160 to 190° C., for 10 min-6 h, in particular 10 min-60 min.

The second component K2 of the heat-curing epoxy resin composition contains at least one primary amine pAM chosen from the list consisting of 1,3-xylylenediamine (MXDA), 1,4-xylylenediamine (PXDA) and 1,3,5-tris(aminomethyl)benzene. Preferably, it is 1,3-xylylenediamine (MXDA).

The ratio of the proportion of primary amine pAM in grams per mole of epoxy groups of the epoxy resin A is 6-31 g/mol of epoxy groups.

Preferably, the ratio of the proportion of the primary amine pAM in grams per mole of epoxy groups of the epoxy resin A is 6-27 g/mol, 6-24 g/mol, 6-16 g/mol, 6-14 g/mol, 7-14 g/mol, in particular 7-12 g/mol, of epoxy groups. This is advantageous to the effect that, through this, high values for the tensile shear strength after heating at a temperature of 90-130° C., in particular of 110-120° C., for 10 s-300 s, in particular 30 s-90 s, and also a high tensile shear strength after the curing at a temperature in the range from 100 to 220° C., preferably 160 to 190° C., for 10 min-6 h, in particular 10 min-60 min, are obtained.

Furthermore, it is preferable for the heat-curing epoxy resin composition to additionally contain at least one filler F, Preference is given here to carbon black, mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic beads, hollow glass beads, hollow organic beads, glass beads, color pigments. Filler F means both the organically coated and the uncoated commercially available forms known to a person skilled in the art.

Advantageously, the total proportion of the combined filler F is 2-50% by weight, preferably 10-40% by weight, in particular 20-40% by weight, based on the total weight of the heat-curing epoxy resin composition.

Advantageously, the composition additionally contains at least one reactive diluent carrying epoxy groups G. These reactive diluents G are in particular:
  glycidyl ethers of monofunctional, saturated or unsaturated, branched or unbranched, cyclic or open-chain. $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether, and the like;
  glycidyl ethers of difunctional, saturated or unsaturated, branched or unbranched, cyclic or open-chain, $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, and the like;
  glycidyl ethers of tri- or polyfunctional, saturated or unsaturated, branched or unbranched, cyclic or open-chain, alcohols, such as epoxidized castor oil, epoxidized trimethylolpropane, epoxidized pentaerythritol or polyglycidyl ethers of aliphatic polyols, such as sorbitol, glycerol, trimethylolpropane, and the like;
  glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, and the like;
  epoxidized amines, such as N,N-diglycidylcyclohexylamine, and the like;
  epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids, and the like;
  epoxidized di- or trifunctional, low to high molecular weight polyether polyols, such as polyethylene glycol diglycidyl ether, polypropylene glycol diglycidyl ether, and the like.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the reactive diluent carrying epoxy groups G is 0.1-20% by weight, preferably 0.5-8% by weight, based on the total weight of the heat-curing epoxy resin composition.

Preferably, the component K2 additionally exhibits an abovementioned filler F. In particular, the filler F in the component K2 is pyrogenic silica. Furthermore, it is preferable for the ratio by weight of the sum of (tertiary amine tAM+primary amine pAM) to the total amount of the filler F to be from 3:1 to 1:3, in particular 1.5:1 to 1:1.5.

Furthermore, it is advantageous for the total weight of the component K2 to be less than 20% by weight, in particular less than 10% by weight, in particular less than 5% by weight, based on the total weight of the heat-curing epoxy resin composition.

Preferably, the component K2 consists, to more than 50% by weight, more than 70% by weight, more than 80% by weight, more than 90% by weight, more than 95% by weight, more than 98% by weight, of tertiary amine tAM, primary amine pAM and filler F, based on the total weight of the component K2.

Such an abovementioned component K2 is advantageous to the effect that such a component K2 can additionally be added to a commercial one-component heat-curing epoxy resin composition, if the need exists, after a partial curing/procuring by means of a short-term heat treatment, to achieve sufficient strength and adhesion for the further transportation of a component part made available from that. In particular if an increase in the tensile shear strength after a heating at a temperature of 90-130° C., in particular of 110-120° C., for 10 s-300 s, in particular 30 s-90 s, is desired.

An additional aspect of the present invention is accordingly the use of an abovementioned component K2 for the partial curing of a heat-curing epoxy resin composition comprising:
  a first component K1, as has been mentioned above, and
  at least one curing agent B for epoxy resins, which is activated through elevated temperature, as has been mentioned above.

Preferably, the partial curing of the heat-curing epoxy resin composition is a partial curing by means of short-term heat treatment to achieve sufficient strength and adhesion for the further transportation of a component part. In particular an increase in the tensile shear strength after a heating at a temperature of 90-130° C., in particular of 110-120° C., for 10 s-300 s, in particular 30 s-90 s. The tensile shear strength is typically measured according to DIN EN 1465, particularly preferably as described in the Examples section.

The increase in the tensile shear strength is preferably more than 5%, more than 10%, more than 15%, more than 20%, in particular more than 30% and preferably less than 70%, of the cured heat-curing epoxy resin composition. Preferably, the curing of the epoxy resin composition is carried out as described below as stage d). It is furthermore preferred for the increase in the tensile shear strength to result in a value greater than 1 MPa, preferably greater than 2 MPa, in particular greater than 3 MPa. The increase in the tensile shear strength refers to an increase in comparison with a heat-curing epoxy resin composition comprising a component K1 described above and also at least one curing agent B for epoxy resins, which is activated through elevated temperature.

The heat-curing epoxy resin composition preferably exhibits, at 25° C., immediately, in particular 1-80 seconds, after the mixing a viscosity of 500-4000 Pa·s. The composition can thereby be easily applied at ambient temperature. The viscosities given in this document were measured on a rheometer (Physica MCR 101, Anton Paar) by means of osoillographic measurement (gap: 1000 μm, plate/plate, plate diameter: 25 mm, frequency: 5 Hz, required deformation: 0.01) in a temperature range of 23-70° C. (heating rate: 10° C./min).

It has been shown that the heat-curing epoxy resin compositions described are particularly suitable for use as heat-curing adhesives, in particular as heat-curing bodyshell adhesive in motor vehicle construction and/or for hem flange adhesive bonds. Such a one-component adhesive exhibits a range of possible uses.

One aspect of the invention accordingly relates to the use of the heat-curing epoxy resin compositions described as heat-curing adhesive, in particular as heat-owing bodyshell adhesive in motor vehicle construction and/or for hem flange adhesive bonds.

Such adhesives are required for the adhesive bonding of heat-stable materials. Heat-stable materials are understood to mean materials which are dimensionally stable at a curing temperature of 100-220° C., preferably 120-200° C., at least during the curing time. In particular, these are metals and plastics, such as ABS, polyamide, polyphenylene ether, composite materials, such as SMC, unsaturated polyesters GFP, epoxy or acrylate composite materials. Preference is given to the use in which at least one material is a metal. A particularly preferred use is the adhesive bonding of identical or different metals, in particular in bodyshell construction in the automobile industry and/or for hem flange adhesive bonds. The preferred metals are in particular steel, especially electrolytically galvanized, hot-dip-galvanized or oiled steel, Bonazinc-coated steel, and post-phosphated steel, and also aluminum, especially in the variants which typically occur in automobile construction.

The heat-curing compositions according to the invention make possible adhesives which, after short-term heating of 10 to 300 seconds, in particular 30 to 90 seconds, at a temperature of 90° C. to 130° C., exhibit sufficient strength and adhesion to withstand transport-induced mechanical strains, and, in the completely cured condition, with regard to strength and adhesion, satisfy the requirements of a structural adhesive.

Such an adhesive is in particular first brought into contact with the materials to be adhesive-bonded at a temperature of between 10° C. and 80° C., in particular between 10° C. and 60° C., and the epoxy resin composition is later heated at a temperature of 90-130° C., in particular of 110-120° C., and then cured at a temperature in the range from 100 to 220° C.

A further aspect of the present invention relates to a process for the bonding of heat-stable substrates, which comprises the stages:
a) applying a heat-curing epoxy resin composition as described above to the surface of a heat-stable substrate S1, in particular of a metal;
b) bringing the heat-curing epoxy resin composition applied into contact with the surface of a further heat-stable substrate S2, in particular of a metal;
c) heating the epoxy resin composition at a temperature of 90-130° C., in particular of 110-120° C.;
d) curing the epoxy resin composition at a temperature in the range from 100 to 220° C., preferably 140-220° C., in particular of 140-200° C., preferably between 160 and 190° C.

The substrate S2 consists here of the same material as or a different material from the substrate S1.

The substrates S1 and/or S2 are in particular the aforementioned metals and plastics.

It is advantageous, in the heating in stage c) of the epoxy resin composition at a temperature of 90-130° C., in particular of 110-120° C., for the epoxy resin composition to be left at the abovementioned temperature for 10 s-300 s, 20 s-200 s, 30 s-120 s, 30 s-90 s, particularly preferably 30 s-60 s.

Preferably, in stage c), the heating of the epoxy resin composition is carried out by means of induction.

It is furthermore advantageous for stage a) to be carried out within 20 min, preferably 15 min, in particular 10 min, after the mixing of the epoxy resin composition.

Preferably, in the curing in stage d) of the epoxy resin composition at a temperature in the range from 100 to 220° C., preferably 140-220° C., in particular of 140-200° C., preferably between 160 and 190° C., the epoxy resin composition is left at the abovementioned temperature for 10 min-6 h, 10 min-2 h, 10 min-60 min, 10 min-30 min, particularly preferably 10 min-25 min.

Furthermore, it is preferable, between stage c) and d), for the epoxy resin composition to be brought to a temperature of 0-50° C., 10-40° C., in particular of 15-30° C., preferably for more than 5 min, more than 10 min, more than 20 min, more than 25 min, particularly preferably 30-60 min.

Preferably, between stages c) and d), a localized stage of transportation takes place with the compound structure of the epoxy resin composition with the heat-stable substrates S1 and S2.

Furthermore, it is also advantageous for there to be a time gap, between stages c) and d), of more than 5 min, more than 10 min, more than 20 min, more than 25 min, particularly preferably 30-120 min, most preferably 30-60 min.

Furthermore, there is preferably a time gap, between stages a) and c), of less than 12 h, less than 3 h, particularly preferably 30-120 min.

Furthermore, it can be advantageous for the operation in which the heat-curing epoxy resin composition applied is brought into contact with the surface of an additional heat-stable substrate S2 in stage b) to be a hemming of a heat-stable substrate S2 with a heat-stable substrate S1, in particular for the heat-stable substrates to be an outer panel and an inner panel.

The abovementioned process for the adhesive bonding of heat-stable materials results in an adhesive-bonded article. Such an article is preferably a motor vehicle or part of a motor vehicle, in particular an add-on part of a motor vehicle.

A further aspect of the present invention accordingly relates to an adhesive-bonded article obtained from the abovementioned process. Furthermore, the compositions according to the invention are suitable not only for automobile construction but also for other fields of use. Particular mention should be made of related applications in the construction of transportation means, such as ships, trucks, buses or rail vehicles, or in the construction of consumer goods, such as, for example, washing machines.

The materials adhesive-bonded by means of a composition according to the invention are used at temperatures between typically 120° C. and −40° C., preferably between 100° C. and −40° C., in particular between 80° C. and −40° C.

Surprisingly, it has been found that other accelerators for heat-curing epoxy resin compositions do not comply with the requirements with reference to sufficient strength and adhesion, both after short-term warming, in particular by means of induction, and after post-curing. Thus, for example, it is obvious, in table 3, that, for example on using a tertiary amine (HMTA, Ineos) or an imidazole (imidazole, Fluka, Switzerland), in each case alone or in combination with K54, the strength and adhesion after short-term warming by means of induction (30 s, resp. 90 s, at 120° C.) is not sufficient. Furthermore, it is obvious, in table 3, that K54 alone was not capable of complying with both requirements simultaneously.

Particularly preferably concerned are heat-curing epoxy resin compositions which, after stage c), in particular 5-60 min, preferably 10-20 min, after stage c), exhibit a tensile shear strength, in particular measured according to DIN EN 1465, particularly preferably as described in the Examples section, of more than 1 MPa, more than 2 MPa, more than 3 MPa.

Additionally preferred are heat-curing epoxy resin compositions which, after stage d), exhibit a tensile shear strength, in particular measured according to DIN EN 1465, particularly preferably as described in the Examples section, of more than 15 MPa, more than 20 MPa, more than 25 MPa.

EXAMPLES

Some examples which further illustrate the invention, but which are not intended to restrict the scope of the invention in any way, are cited below.

Preparation of a Toughness Improver ("D-1")

150 g of poly-THF 2000 (OH number 57 mg/g KOH) and 150 of Liquiflex H (OH number 46 mg/g KOH) were dried under vacuum at 105° C. for 30 minutes. Once the temperature had been reduced to 90° C., 61.5 g of IPDI and 0.14 g of dibutyltin dilaurate were added. The reaction was carried out under vacuum at 90° C. until the NCO content was constant at 3.10% after 2.0 h (calculated NCO content: 3.15%). Subsequently, 96.1 g of cardanol were added as blocking agent. Stirring was continued at 105° C. under vacuum until it was no longer possible to detect any free NCO. The product was used as such as toughness improver D-1.

TABLE 1

| Starting materials used | |
| --- | --- |
| A-Liquid resin | Liquid epoxy resin, D.E.R. 331 (bisphenol A diglycidyl ether), Dow |
| Reactive diluent | Hexanediol glycidyl ether, Denacol EX-212, Nagase America |
| B-1 | Curing agent, dicyandiamide (="Dicy") |
| B-2 | Curing agent, substituted urea |
| Filler mixture | Mixture of calcium carbonate, calcium oxide, fumed silica |
| K54 | Ancamine K54 ®, 2,4,6-tri(dimethylaminomethyl)phenol, Air Products GmbH (Germany) |

TABLE 1-continued

| Starting materials used | |
| --- | --- |
| MXDA | 1,3-Xylylenediamine (MXDA) |
| HMTA | Hexamethylenetetramine, Ineos |
| Imidazole | Imidazole, Fluka, Switzerland |
| | Poly-THF 2000 (difunctional polybutylene glycol) (OH equivalent weight = about 1000 g/OH equivalent), BASF |
| | Liquiflex H (hydroxyl-terminated polybutadiene) (OH equivalent weight = about 1230 g/OH equivalent), Krahn |
| | Isophorone diisocyanate (="IPDI"), Evonik |
| | Cardolite NC-700 (cardanol, meta-substituted alkenylmonophenol), Cardolite |

TABLE 2

| Base composition | | | |
| --- | --- | --- | --- |
| | EP value [moles of epoxy groups/100 g of resin] | Base composition | |
| | | [% by wt.] | [g] |
| A-Liquid resin | 0.54 | 46.5 | 23.25 |
| Reactive diluent | 0.80 | 0.5 | 0.25 |
| D-1 | | 20 | 10 |
| B-1 | | 3.7 | 1.85 |
| B-2 | | 0.2 | 0.1 |
| Filler mixture | | 29.1 | 14.55 |
| Sum: | | 100 | 50 |

Production of the Compositions

Each time batches of 50 g of the base composition were prepared according to the details in tables 1-2. Afterwards, the reference compositions Ref.1-Ref.28 and also the compositions according to the invention Ex.1-Ex.7 were prepared according to the details of table 3 by the supplementary addition of optionally K54, MXDA, HMTA or imidazole.

Calculation of g/Mol of Epoxy Groups for tAM and pAM Respectively (g/Mol EP)

Epoxy resins are classified according to their epoxy content, which is also known as epoxy value (also EP value). In the present document, the epoxy value represents the number of the epoxy groups in moles which are found in 100 grams of synthetic resin. Thus, for example in table 2, as epoxy value simplified under "EP value", a numerical value, such as, for example, "0.54", stands for an epoxy value of 0.54 mol of epoxy groups/100 g of resin.

The ratio of the proportion of tertiary amine tAM in grams per mole of epoxy groups of the epoxy resin A (called "g/mol EP" in table 3) is calculated, for example, for the composition Ex.1 as follows:

(amount in grams of K54)/((amount in grams of A-liquid resin*epoxy value of A liquid resin)+ (amount in grams of reactive diluent*epoxy value of reactive diluent)).

The ratio of the proportion of primary amine pAM in grams per mole of epoxy groups of the epoxy resin A (called "g/mol EP" in table 3) is calculated, for example, for the composition Ex.1 as follows:

(amount in grams of MXDA)/((amount in grams of A-liquid resin*epoxy value of A-liquid resin)+ (amount in grams of reactive diluent epoxy value of reactive diluent)).

Test Methods:

Tensile Shear Strength (TSS) (DIN EN 1465 after Induction ("TSS Ind")

Purified test panels of HOG H420 steel (thickness 1.5 mm) re-oiled with Anticorit PL 3802-39S were adhesive-bonded with the adhesive to a surface to be adhesive-bonded of 25×10 mm with glass beads as spacer in a layer thickness of 0.3 mm. The adhesive compositions were applied to the surface to be adhesive-bonded a maximum of 8 min after mixing.

Immediately afterwards, the test specimen was cured at 120° C. by induction for 30 seconds and 90 seconds respectively. A temperature probe was secured in each case to the surface of the test sample (substrate surface). The attainment of the temperature indicated, accurate to 1° C., was in each case the start of the measurement of the curing time. The heating of the test specimen to 120° C. lasted 30 seconds in The tensile shear strength was determined on a tensile testing machine at a pull rate of 10 mm/min in a triple determination according to DIN EN 1465.

Tensile shear strength (TSS) (DIN EN 1465) after induction ("TSS Ind+oven")

Purified test panels of HDG H420 steel (thickness 1.5 mm) re-oiled with Anticorit FL 3802-39S were adhesive-bonded with the adhesive to a surface to be adhesive-bonded of 25×10 mm with glass beads as spacer in a layer thickness of 0.3 mm.

Immediately afterwards, the test specimens were precured by means of induction as described above. Afterwards, the test specimens were left at ambient temperature and 2 hours afterwards cured at an oven temperature of 175° C. for 35 min. Afterwards, the tensile shear strength was determined on a tensile testing machine at a pull rate of 10 mm/min in a triple determination according to DIN EN 1465.

TABLE 3

|  |  | Base formulation g | K54 g | g/mol EP | MXDA g | g/mol EP | HMTA g | Imidazole g | TSS Ind [MPa] | TSS Ind + oven [MPa] |
|---|---|---|---|---|---|---|---|---|---|---|
| Ind 30 Sec 120° C. | Ref. 1 | 50.00 | — | — | — | — | | | 0.00 | 28.10 |
| | Ref. 2 | 50.00 | 0.51 | 4.0 | — | — | | | 0.04 | 23.70 |
| | Ref. 3 | 50.00 | 1.55 | 12.2 | — | — | | | 0.65 | 20.90 |
| | Ref. 4 | 50.00 | 5.56 | 43.6 | — | — | | | 7.89 | 14.50 |
| | Ref. 5 | 50.00 | — | — | — | — | | 2.63 | 0.04 | 22.90 |
| | Ref. 6 | 50.00 | 0.25 | 2.0 | 0.51 | 4.0 | | | 0.05 | 22.90 |
| | Ref. 7 | 50.00 | 0.26 | 2.0 | 1.03 | 8.1 | | | 0.05 | 26.20 |
| | Ref. 8 | 50.00 | 0.26 | 2.0 | 1.55 | 12.2 | | | 0.09 | 24.50 |
| | Ref. 9 | 50.00 | 0.51 | 4.0 | 0.51 | 4.0 | | | 0.22 | 26.40 |
| | Ref. 10 | 50.00 | 0.52 | 4.1 | 1.03 | 8.1 | | | 0.20 | 21.70 |
| | Ref. 11 | 50.00 | 0.52 | 4.1 | 1.65 | 12.2 | | | 0.31 | 17.20 |
| | Ref. 12 | 50.00 | 0.77 | 6.0 | 0.51 | 4.0 | | | 0.35 | 23.10 |
| | Ex. 1 | 50.00 | 0.78 | 6.1 | 1.04 | 8.2 | | | 1.03 | 20.40 |
| | Ex. 2 | S0.00 | 0.79 | 6.2 | 1.57 | 12.3 | | | 2.63 | 22.20 |
| | Ex. 3 | 50.00 | 1.04 | 8.2 | 1.04 | 8.2 | | | 2.62 | 25.90 |
| | Ex. 4 | 50.00 | 1.04 | 8.2 | 1.57 | 12.3 | | | 4.50 | 20.20 |
| | Ex. 5 | 50.00 | 1.57 | 12.3 | 1.57 | 12.3 | | | 10.90 | 18.60 |
| | Ref. 13 | 50.00 | 0.52 | 4.1 | 1.03 | 8.1 | | | 0.06 | 23.90 |
| Ind 90 Sec 120° C. | Ref. 14 | 50.00 | — | — | — | — | | | 0.00 | 29.80 |
| | Ref. 15 | 50.00 | 0.51 | 4.0 | — | — | | | 0.08 | 28.80 |
| | Ref. 16 | 50.00 | 5.56 | 43.6 | — | — | | | 5.95 | 13.30 |
| | Ref. 17 | 50.00 | 0.25 | 2.0 | 0.25 | 2.0 | | | 0.06 | 28.20 |
| | Ref. 18 | 50.00 | 0.25 | 2.0 | 0.51 | 4.0 | | | 0.09 | 25.90 |
| | Ref. 19 | 50.00 | 0.26 | 2.0 | 1.03 | 8.1 | | | 0.31 | 22.20 |
| | Ref. 20 | 50.00 | 0.38 | 3.0 | 0.25 | 2.0 | | | 0.05 | 21.70 |
| | Ref. 21 | 50.00 | 0.38 | 3.0 | 0.51 | 4.0 | | | 0.33 | 25.80 |
| | Ex. 6 | 50.00 | 0.39 | 3.1 | 1.03 | 8.1 | | | 1.36 | 20.00 |
| | Ref. 22 | 50.00 | 0.51 | 4.0 | 0.25 | 2.0 | | | 0.09 | 26.50 |
| | Ref. 23 | 50.00 | 0.51 | 4.0 | 0.51 | 4.0 | | | 0.82 | 21.90 |
| | Ex. 7 | 50.00 | 0.52 | 4.1 | 1.03 | 8.1 | | | 4.29 | 23.20 |
| | Ref. 24 | 50.00 | — | — | — | — | 2 | | <0.4 | n.d. |
| | Ref. 25 | 50.00 | — | — | 2.0 | 15.7 | | | <0.4 | n.d. |
| | Ref. 26 | 50.00 | — | — | — | — | | 2 | <0.4 | n.d. |
| | Ref. 27 | 50.00 | 0.50 | 3.9 | — | — | 1.5 | | <0.4 | n.d. |
| | Ref. 28 | 50.00 | 0.50 | 3.9 | — | — | | 1.5 | <0.4 | n.d. | n.d. = not determined each case. The curing process for the test specimens of Ex.1 lasted, for example, for a heating time of 30 seconds, until the 120° C. was reached, and also additionally for a curing time of 30 seconds at 120° C. The induction device is from IFF GmbH Deutschland (EW020T controller, LA-PEZ induction device).

The tensile shear strength of the test specimens was determined 15 minutes after the induction process. The tensile shear strength was determined on a tensile testing machine at a pull rate of 10 mm/min in a triple determination according to DIN EN 1465.

The invention claimed is:

1. A heat-curing epoxy resin composition comprising:
   at least one curing agent B for epoxy resins, the at least one curing agent B is configured to be activated by elevated temperature;
   a first component K1 containing:
      at least one epoxy resin A with, on average, more than one epoxy group per molecule, wherein a proportion of the at least one epoxy resin A is in a range of 10 to 50% by weight, based on a total weight of the heat-curing epoxy resin composition;

a second component K2 containing:
   at least one tertiary amine tAM represented by formula (I):

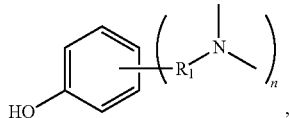

(I)

in which $R_1$ is an alkylene group with 1-20 carbon atoms, which is optionally substituted and optionally contains heteroatoms, and n is a value of 1-3;
   at least one primary amine pAM chosen from the list consisting of 1,3-xylylenediamine (MXDA), 1,4-xylylenediamine (PXDA), and 1,3,5-tris(aminomethyl)benzene, wherein:
   a ratio of a proportion of the at least one tertiary amine tAM in grams per mole of epoxy groups of the at least one epoxy resin A is in a range of 2.4-19.6 g/mol of epoxy groups, and
   a ratio of a proportion of the at least one primary amine pAM in grams per mole of epoxy groups of the at least one epoxy resin A is in a range of 6-31 g/mol of epoxy groups.

2. The heat-curing epoxy resin composition as claimed in claim 1, wherein the ratio of the proportion of the at least one tertiary amine tAM in grams per mol of epoxy groups of the at least one epoxy resin A is in a range of 2.4-13.7 g/mol of epoxy groups.

3. The heat-curing epoxy resin composition as claimed in claim 1, wherein the ratio of the proportion of the at least one tertiary amine tAM in grams per mol of epoxy groups of the at least one epoxy resin A is in a range of 4.7-13.7 g/mol of epoxy groups.

4. The heat-curing epoxy resin composition as claimed in claim 1, wherein
   $R_1$ is $CH_2$ or $-CH_2-NH-C_3H_6$ and
   n=1-3.

5. The heat-curing epoxy resin composition as claimed in claim 1, wherein the at least one tertiary amine tAM is chosen from the group consisting of 2-(dimethylaminomethyl)phenol, 2,6-bis(dimethylaminomethyl)phenol, 2,4-bis(dimethylaminomethyl)phenol, 2,4,6-tris(dimethylaminomethyl)phenol, and 2,4,6-tris(((3-(dimethylamino)propyl)amino)methyl) phenol.

6. The heat-curing epoxy resin composition as claimed in claim 1, wherein the ratio of the proportion of the at least one primary amine pAM in grams per mol of epoxy groups of the at least one epoxy resin A is in a range of 6-27 g/mol of epoxy groups.

7. The heat-curing epoxy resin composition as claimed in claim 1, wherein
   the at least one curing agent B is dicyandiamide, and
   a ratio of a proportion of the dicyandiamide in grams per mole of epoxy groups of the at least one epoxy resin A is 10-20 g/mol of epoxy groups.

8. The heat-curing epoxy resin composition as claimed in claim 1, wherein the heat-curing epoxy resin composition exhibits, immediately after the mixing at 25° C., a viscosity that is in a range of 500-4000 Pa·s.

9. A process for the adhesive bonding of heat-stable substrates, comprising:
   a) applying the heat-curing epoxy resin composition as claimed in claim 1 to the surface of a heat-stable substrate S1;
   b) bringing the heat-curing epoxy resin composition applied into contact with the surface of a further heat-stable substrate S2;
   c) heating the heat-curing epoxy resin composition at a temperature that is in a range of 90-130° C.;
   d) curing the heat-curing epoxy resin composition at a temperature that is in a range from 100 to 220° C.;
   in which the substrate S2 consists of the same material as or a different material from the substrate S1.

10. The process as claimed in claim 9, wherein the heating in c) includes leaving the heat-curing epoxy resin composition at the temperature that is in a range of 90-130° C. for 10 s-300 s.

11. The process as claimed in claim 9, wherein the curing in d) includes leaving the heat-curing epoxy resin composition at the temperature that is in a range from 100 to 220° C. for 10 min-6 h.

12. The process as claimed in claim 9, wherein between c) and d), the process further comprising bringing the heat-curing epoxy resin composition to a temperature that is in a range of 0-50° C.

13. An adhesive-bonded article obtained from the process as claimed in claim 9.

14. A method comprising applying the heat-curing epoxy resin composition as claimed in claim 1 as a heat-curing adhesive.

15. A method comprising partially curing the heat-curing epoxy resin composition as claimed in claim 1 by mixing the second component K2, the first component K1, and the at least one curing agent B.

16. The heat-curing epoxy resin composition as claimed in claim 1, wherein the more than one epoxy group is a glycidyl ether group.

17. The heat-curing epoxy resin composition as claimed in claim 1, further comprising at least one filler F, a total proportion of the at least one filler F being in a range of 10 to 50% by weight, based on a total weight of the heat-curing epoxy resin composition.

* * * * *